(12) United States Patent
Kagawa et al.

(10) Patent No.: US 10,902,875 B2
(45) Date of Patent: *Jan. 26, 2021

(54) SINGLE REEL MAGNETIC TAPE CARTRIDGE WITH PRE-DEFINED TAPE WIDTH DIFFERENCE

(71) Applicant: FUJIFILM Corporation, Tokyo (JP)

(72) Inventors: Yusuke Kagawa, Minami-ashigara (JP); Norihito Kasada, Minami-ashigara (JP); Yuto Murata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,154

(22) Filed: Apr. 15, 2020

(65) Prior Publication Data

US 2020/0243111 A1 Jul. 30, 2020

Related U.S. Application Data

(63) Continuation of application No. 16/281,169, filed on Feb. 21, 2019, now Pat. No. 10,679,659.

(30) Foreign Application Priority Data

| Feb. 20, 2018 | (JP) | 2018-027623 |
| Apr. 10, 2018 | (JP) | 2018-075653 |
| Jan. 11, 2019 | (JP) | 2019-003415 |

(51) Int. Cl.
*G11B 5/78* (2006.01)
*G11B 23/107* (2006.01)
(Continued)

(52) U.S. Cl.
CPC ............ *G11B 5/78* (2013.01); *G11B 5/70* (2013.01); *G11B 5/73* (2013.01); *G11B 5/735* (2013.01);
(Continued)

(58) Field of Classification Search
None
See application file for complete search history.

(56) References Cited

U.S. PATENT DOCUMENTS 10,679,659 B2 * 6/2020 Kagawa et al. ......... G11B 5/78
2004/0021024 A1 2/2004 Yoshimura et al.
(Continued)

FOREIGN PATENT DOCUMENTS

| JP | 2005-346865 A | 12/2005 |
| JP | 2009-087471 A | 4/2009 |

(Continued)

OTHER PUBLICATIONS

Brian L Weick, Ph.D., "Dimensional Stability of Magnetic Tape", Dec. 10, 2015, pp. 1-13, XP55596448, retrieved from the Internet: URL: https://www.fujifilmusa.com/products/tape_data_storage/case_studies/pdf/Dimensional_Stability.pdf [retrieved on Jun. 13, 2019] (13 pages total).

(Continued)

*Primary Examiner* — Craig A. Renner
(74) *Attorney, Agent, or Firm* — Sughrue Mion, PLLC

(57) ABSTRACT

Provided is a magnetic tape cartridge of a single reel type in which a magnetic tape is wound around a reel, in which the magnetic tape includes a non-magnetic support, and a magnetic layer including a ferromagnetic powder and a binding agent on the non-magnetic support, a tape thickness is equal to or smaller than 5.2 μm, a tape width difference (B−A) between a tape width A at a position of 10 m±1 m from a tape outer end and a tape width B at a position of 50 m±1 m from a tape inner end is 2.4 μm to 12.0 μm, and the tape width A and the tape width B are values measured 100 days from the date of magnetic tape cartridge manufacture.

12 Claims, 2 Drawing Sheets

(51) Int. Cl.
  *G11B 5/70*  (2006.01)
  *G11B 5/73*  (2006.01)
  *G11B 5/735*  (2006.01)
(52) U.S. Cl.
  CPC .......... *G11B 5/736* (2019.05); *G11B 5/73927* (2019.05); *G11B 5/73929* (2019.05); *G11B 23/107* (2013.01); *G11B 5/73923* (2019.05)

(56) References Cited

U.S. PATENT DOCUMENTS

| | | |
|---|---|---|
| 2004/0089564 A1 | 5/2004 | Kuse et al. |
| 2005/0153170 A1* | 7/2005 | Inoue et al. ......... G11B 23/107 428/842.3 |
| 2006/0153977 A1 | 7/2006 | Uchiumi |
| 2009/0086369 A1 | 4/2009 | Ishida et al. |
| 2010/0247968 A1 | 9/2010 | Ishikawa et al. |
| 2013/0172515 A1 | 7/2013 | Horie et al. |

FOREIGN PATENT DOCUMENTS

| | | |
|---|---|---|
| JP | 2010-238346 A | 10/2010 |
| WO | 2012/043281 A1 | 4/2012 |

OTHER PUBLICATIONS

Extended European Search Report (EESR) dated Jun. 26, 2019, from the European Patent Office in counterpart European Application No. 19158109.9.
Brian L Weick, "Viscoelastic analysis applied to the determination of long-term creep behavior for magnetic tape materials", Journal of Applied Polymer Science, vol. 102, No. 2, Oct. 15, 2006, pp. 1106-1128, XP55596456 (23 pages total).
Communication dated Jul. 14, 2020 from the European Patent Office in European Application No. 19158109.9.
Office Action dated Oct. 6, 2020 from the Japanese Patent Office in Japanese Application No. 2019-003415.

* cited by examiner

SINGLE REEL MAGNETIC TAPE CARTRIDGE WITH PRE-DEFINED TAPE WIDTH DIFFERENCE

CROSS-REFERENCE TO RELATED APPLICATIONS

This application is a continuation application of U.S. patent application Ser. No. 16/281,169, filed Feb. 21, 2019, which claims priority under 35 U.S.C 119 to Japanese Patent Applications No. 2018-027623 filed on Feb. 20, 2018, No. 2018-075653 filed on Apr. 10, 2018, and No. 2019-003415 filed on Jan. 11, 2019. Each of the above applications is hereby expressly incorporated by reference, in its entirety, into the present application.

BACKGROUND OF THE INVENTION

1. Field of the Invention

The present invention relates to a magnetic tape cartridge.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archives (for example, see JP2005-346865A).

The recording and reproducing of signals on the magnetic tape are normally performed by setting a magnetic tape cartridge accommodating a magnetic tape wound around a reel, on a magnetic tape device which is called a drive, causing the magnetic tape to run in the magnetic tape device, and bringing a surface of a tape (surface of a magnetic layer) and a magnetic head into contact with each other and to slide on each other.

SUMMARY OF THE INVENTION

The recording of information on a magnetic tape is normally performed by recording a magnetic signal on a data band of a magnetic tape. Accordingly, a data track is formed on the data band.

Meanwhile, in a case of reproducing the recorded information, the magnetic tape is caused to run in a magnetic tape device to cause a magnetic head to follow the data track of the magnetic tape, and the information recorded on the data track is read. Here, in a case where accuracy of the magnetic head following the data track is low, a reproducing error may occur.

Meanwhile, an increase in recording capacity (high capacity) of the magnetic tape is required in accordance with a great increase in information content in recent years. As means for realizing high capacity, a technology of decreasing a thickness of the magnetic tape (hereinafter, also referred to as "thinning") and increasing a length of the magnetic tape accommodated in 1 reel of the magnetic tape cartridge is used. However, according to the studies of the inventors, in a case where the thickness of the magnetic tape is decreased, a phenomenon that a reproducing error easily occurs is seen.

Therefore, an object of one aspect of the invention is to achieve both of thinning of the magnetic tape and prevention of reproducing error occurrence.

According to one aspect of the invention, there is provided a magnetic tape cartridge of a single reel type in which a magnetic tape is wound around a reel, in which the magnetic tape includes a non-magnetic support, and a magnetic layer including a ferromagnetic powder and a binding agent on the non-magnetic support, a tape thickness is equal to or smaller than 5.2 µm, a tape width difference (B−A) between a tape width A at a position of 10 m±1 m from a tape outer end and a tape width B at a position of 50 m±1 m from a tape inner end is 2.4 nm to 12.0 nm, and the tape width A and the tape width B are values measured 100 days from the date of magnetic tape cartridge manufacture.

In one aspect, a tape width deformation rate of the magnetic tape measured within 20 minutes, after the magnetic tape is stored in a dry environment at a temperature of 52° C. for 24 hours in a state where a load of 100 g is applied to a tape in a longitudinal direction and the load is removed, may be equal to or smaller than 400 ppm. The tape width deformation rate is a value obtained by starting the storage described above 100 days from the date of magnetic tape cartridge manufacture.

In one aspect, the magnetic tape may include a non-magnetic layer including a non-magnetic powder and a binding agent, between the non-magnetic support and the magnetic layer.

In one aspect, the magnetic tape may include a back coating layer including a non-magnetic powder and a binding agent on a surface side of the non-magnetic support opposite to a surface side provided with the magnetic layer.

In one aspect, the non-magnetic support may be a polyethylene naphthalate support.

In one aspect, the non-magnetic support may be an aromatic polyamide support.

In one aspect, the non-magnetic support may be a polyethylene terephthalate support.

According to one aspect of the invention, it is possible to provide a magnetic tape cartridge including a magnetic tape having a thinned tape thickness equal to or smaller than 5.2 µm and capable of preventing occurrence of a reproducing error during the reproduction of information recorded on the magnetic tape.

DESCRIPTION OF THE PREFERRED EMBODIMENTS

Magnetic Tape Cartridge

Figure 1:
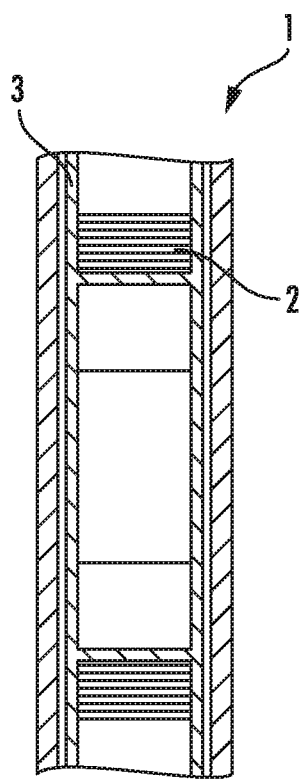
FIG. 1 is a cross-sectional view of an example of an embodiment of a magnetic tape cartridge of the invention. Magnetic tape cartridge 1 comprises a single reel 3 around which is wound a magnetic tape 2.
Figure 2:
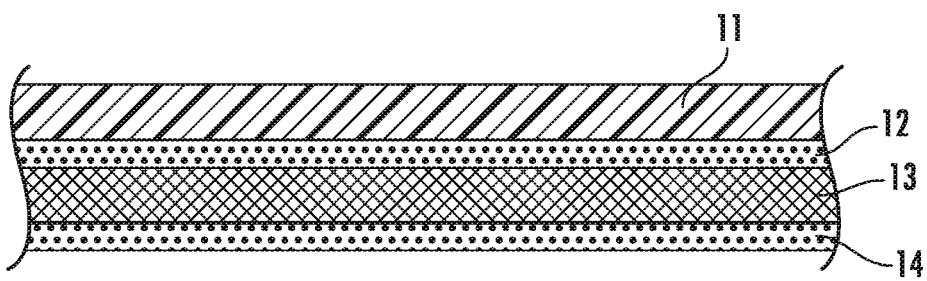
FIG. 2 is a schematic cross-sectional illustration of an embodiment of a magnetic tape suitable for use with the magnetic tape cartridge of the invention. The depicted embodiment of a magnetic tape includes a non-magnetic support 13; a magnetic layer 11 including a ferromagnetic powder and a binding agent; a non-magnetic layer 12 including a non-magnetic powder and a binding agent, between the non-magnetic support and the magnetic layer; and a back coating layer 14 including a non-magnetic powder and a binding agent on a surface side of the non-magnetic support opposite to a surface side provided with the magnetic layer.

One aspect of the invention relates to a magnetic tape cartridge of a single reel type in which a magnetic tape is wound around a reel, in which the magnetic tape includes a non-magnetic support, and a magnetic layer including a ferromagnetic powder and a binding agent on the non-magnetic support, a tape thickness is equal to or smaller than 5.2 µm, a tape width difference (B−A) between a tape width A at a position of 10 m±1 m from a tape outer end and a tape width B at a position of 50 m±1 m from a tape inner end is 2.4 µm to 12.0 µm, and the tape width A and the tape width B are values measured 100 days from the date of magnetic tape cartridge manufacture.

One reason of the occurrence of a reproducing error in a case of reproducing information recorded on the magnetic tape is a temporal change f a dimension of the magnetic tape in a width direction from the recording to the reproducing of the information on the magnetic tape. Regarding the dimensional change of the magnetic tape in a width direction, in JP2005-346865A described above, an increase in dimensional stability by providing a reinforcing layer has been proposed (for example, see paragraphs 0014 and 0054 of JP2005-346865A). In other words, this proposal also aims to provide a magnetic tape which is hardly deformed.

In regards to this point, the inventors have made intensive studies about the dimensional change of the magnetic tape accommodated in the magnetic tape cartridge and obtained the following new findings.

The magnetic tape cartridge is manufactured by wounding a magnetic tape, which is obtained by slitting a long magnetic tape raw material to have a regulated width, around a reel of the magnetic tape cartridge. As the configuration of the cartridge, a single reel type including one reel and a twin reel type including two reels are used, and in recent years, a single reel type magnetic tape cartridge is widely used. The inventors have made intensive studies about the temporal deformation of the magnetic tape in the single reel type magnetic tape cartridge, and it is clear that a phenomenon of the occurrence of deformations different depending on positions, in that a portion close to the reel (inner portion) is deformed to have a wider width compared to an initial stage due to compressive stress in a tape thickness direction and a portion far from the reel (outer portion) is deformed to have a narrower width compared to the initial stage due to tensile stress in a tape longitudinal direction, significantly occurs in the thinned magnetic tape (specifically, the tape thickness is equal to or smaller than 5.2 µm). As the reason thereof, the inventors have surmised that, in a case where the magnetic tape is thinned, the compressive stress or the tensile stress applied to each position of the magnetic tape further increases, even in a case where the tension applied to the magnetic tape is same, and as a result, the deformation to have wider or narrower width compared to the initial stage easily occurs. In addition, in a case where the magnetic tape is thinned for realizing high capacity and the length of the magnetic tape accommodated in one reel of the magnetic tape cartridge is increased, the number of magnetic tapes in the magnetic tape cartridge increases. As a result, it is thought that the inner portion (portion close to the reel) of the magnetic tape is compressed more strongly, and therefore, it is surmised that the phenomenon that the inner portion is deformed to have wider width compared to the initial stage more significantly occurs.

From the above findings, the inventors have thought that the temporal deformation of the magnetic tape from the recording (data track formation), which is different depending on the positions as described above, makes the magnetic head difficult to follow a data track and this becomes a reason of the reproducing error.

Therefore, the inventors have thought that, in a case where the deformation occurring over time in the magnetic tape cartridge from the recording to the reproducing is caused to occur in advance, the occurrence of the reproducing error caused by the deformation occurring over time from the recording to the reproducing in the thinned magnetic tape can be prevented, and further made intensive studies. This was a research based on a technical idea which is completely different from a technical idea of the related art aiming to provide a magnetic tape which is hardly deformed. As a result, the inventors have found that the occurrence of the reproducing error, in a case of reproducing information recorded on a magnetic tape thinned to have a tape thickness equal to or smaller than 5.2 µm, can be prevented by causing the deformation to occur in advance so that the tape width difference (B−A) becomes 2.4 µm to 12.0 µm 100 days from the date of magnetic tape cartridge manufacture, and one aspect of the invention has been completed. The reason for using the 100th day from the date of magnetic tape cartridge manufacture as a reference day is because, in the magnetic tape cartridge of the related art, the deformation in which the tape width difference (B−A) becomes equal to or greater than 2.4 µm does not occur 100 days from the date of magnetic tape cartridge manufacture.

However, the above description includes the surmise of the inventors. The surmise of the inventors is also included in the following description. The invention is not limited to such surmise.

Hereinafter, the magnetic tape cartridge will be described.

Configuration of Magnetic Tape Cartridge

The magnetic tape cartridge is a single reel type magnetic tape cartridge. In the single reel type magnetic tape cartridge, a magnetic tape is wound around a single reel. Regarding the configuration of the magnetic tape cartridge, a well-known technology regarding the single reel type magnetic tape cartridge can be applied.

Magnetic Tape

Tape Width Difference (B−A)

In the magnetic tape included in the magnetic tape cartridge, the tape width difference (B−A) between a tape width A at a position of 10 m±1 m from a tape outer end and a tape width B at a position of 50 m±1 m from a tape inner end is 2.4 µm to 12.0 µm. The tape width A and the tape width B are values 100 days from the date of magnetic tape cartridge manufacture.

Identification (ID) information items such as date of manufacture and the like are recorded on the magnetic tape cartridge, for product management. In the invention and the specification, the "date of magnetic tape cartridge manufacture" indicates the date of manufacture which is recorded on the magnetic tape cartridge. Such information is normally recorded on a radio frequency identifier (RFID) tag which is in the cartridge, and the date of manufacture (normally, date recorded as "Date of Manufacturer") can be recognized by reading the RFID tag. Regarding the magnetic tape cartridge in which the tape width difference (B−A) 100 days from the date of magnetic tape cartridge manufacture is in the range described above, the recording of information on the magnetic tape accommodated in the magnetic tape cartridge and the reproducing of the recorded information may be performed on any day before the 100th day, may be performed 100 days, or may be performed on any day after the 100th day from the date of magnetic tape cartridge manufacture. The magnetic tape cartridges having the same product lot number are normally manufactured by using the same raw material under the same manufacturing conditions, and thus, the tape width differences (B−A) 100 days from the date of magnetic tape cartridge manufacture can be assumed to be the same values. The above point is also applied to various physical properties which will be described later, in the same manner.

A portion which is bonded to a region, where the recording and/or reproducing of information is performed, by bonding means using a splicing tape or the like is not considered as a portion of the magnetic tape of which various physical properties such as the tape width difference (B–A) are to be measured. For example, in order to draw and wind the magnetic tape from the magnetic tape cartridge, a leader tape may be bonded to a tape outer end of the magnetic tape. In such a case, the leader tape is not considered as a portion of the magnetic tape of which various physical properties such as the tape width difference (B–A) are to be measured. Accordingly, in a case where the leader tape is bonded, the tape outer end of the magnetic tape is the end of the magnetic tape on a side to which the leader tape is bonded.

The tape outer end is an end portion of the magnetic tape wound around a reel and is farthest from the reel, and a tape width A at a position of 10 m±1 m from the tape outer end represents a tape width of a portion which is deformed to have a narrower width compared to the initial stage due to a strong tension over time. Meanwhile, the tape inner end is an end portion which is a starting point of the winding around the reel, and the tape width B at a position of 50 m±1 m from the tape inner end represents a tape width of a portion which is deformed to have a wider width compared to an initial stage due to strong compression over time.

The magnetic tape cartridge is manufactured by winding the magnetic tape obtained by slitting a long magnetic tape raw material to have a regulated width, around a reel and accommodating the magnetic tape in the magnetic tape cartridge. The regulated width is generally ½ inches (0.0127 meters) and the widths of the slit magnetic tape are equivalent widths at each position. Regarding the equivalent width, a manufacturing error which may normally occur in the slitting step is allowed. With respect to this, as described above, it is thought that deformations of the magnetic tape different depending on positions occur over time from the recording to the reproducing. However, in the magnetic tape cartridge of the related art, the deformation in which the tape width difference (B–A) between the tape width A and the tape width B becomes equal to or greater than 2.4 μm does not occur 100 days from the date of magnetic tape cartridge manufacture. With respect to this, it is thought that, by causing the deformation in which the tape width difference (B–A) becomes equal to or greater than 2.4 μm 100 days from the date of magnetic tape cartridge manufacture to occur in advance, it is possible to prevent the occurrence of the reproducing error caused by the occurrence of the deformation of the magnetic tape different depending on positions over time from the recording to the reproducing as described above. Meanwhile, in a case where a tape width difference between the inner portion and the outer portion of the magnetic tape before the information is recorded is excessively great, an error easily occurs at the time of the recording. With respect to this, in a case where the tape width difference (B–A) is equal to or smaller than 12.0 μm 100 days from the date of magnetic tape cartridge manufacture, the recording of information can be easily performed over the total length of the magnetic tape accommodated in the magnetic tape cartridge. From a viewpoint of further preventing the occurrence of the reproducing error, the tape width difference (B–A) is preferably equal to or greater than 3.0 μm and more preferably equal to or greater than 5.0 μm. Meanwhile, from a viewpoint of further preventing the occurrence of error at the time of the recording, the tape width difference (B–A) is preferably equal to or smaller than 11.0 μm.

The tape width difference (B–A) is a value obtained by the following method. The following operation and measurement are performed in an environment of a temperature of 20° C. to 25° C. and relative humidity of 40% to 60%.

The magnetic tape wound around the reel is extracted from the magnetic tape cartridge 100 days from the date of magnetic tape cartridge manufacture, and a tape sample having a length of 20 cm and including the position of 10 m±1 m from the tape outer end, and a tape sample having a length of 20 cm and including the position of 50 m±1 m from the tape inner end are cut out. The tape width of each tape sample is measured at the center in a longitudinal direction of the tape sample in a state of being sandwiched between plate-shaped members (for example, slide glass), in order to remove the effect of curl. The measurement of the tape width can be performed using a well-known measurement device capable of performing dimensional measurement with accuracy of 0.1 μm order. In addition, the measurement is performed within 20 minutes after the magnetic tape is extracted from the magnetic tape cartridge. In each tape sample, the tape width is respectively measured seven times (N=7), and an arithmetical mean of five measured values excluding the maximum value and the minimum value from the measured values obtained in the seven times of measurements is obtained. In a case where a total length of the magnetic tape accommodated in the magnetic tape cartridge is 950 m, the arithmetical mean obtained as described above is set as a tape width (tape width A or tape width B) at each position. On the other hand, in a case where a total length of the magnetic tape accommodated in the magnetic tape cartridge is a length other than 950 m, a magnetic tape total length is set as L1 (unit: m), the arithmetical mean obtained as described above is set as W1, and W obtained by Equation: W=(950/L1)×W1 is set as a tape width (tape width A or tape width B) at each position. The tape width difference (B–A) can be controlled by performing heat treatment. The heat treatment will be described later in detail.

Tape Width Deformation Rate

In the magnetic tape in which the tape width difference (B–A) 100 days from the date of magnetic tape cartridge manufacture is 2.4 μm to 12.0 μm as described above, a tape width deformation rate measured by the following method is preferably equal to or smaller than 400 ppm (parts per million), more preferably equal to or smaller than 390 ppm, even more preferably equal to or smaller than 380 ppm, still preferably equal to or smaller than 370 ppm, still more preferably equal to or smaller than 360 ppm, and still even more preferably equal to or smaller than 350 ppm. The tape width deformation rate can be, for example, equal to or greater than 10 ppm, and can also be equal to or greater than 100 ppm, equal to or greater than 150 ppm, equal to or greater than 200 ppm, or equal to or greater than 250 ppm. It is thought that, as the tape width deformation rate is small, a dimensional change of the magnetic tape in the width direction from the recording to the reproducing of the information on the magnetic tape is small. Therefore, from a viewpoint of further preventing the occurrence of the reproducing error caused by a change in the tape width from the recording to the reproducing, the magnetic tape width deformation rate is preferably small and may be 0 ppm. The tape width deformation rate can also be controlled by the heat treatment which will be described later in detail.

The tape width deformation rate is a value obtained by the following method. The following operation and measurement are performed in an environment of a temperature of 20° C. to 25° C. and relative humidity of 40% to 60%, except the storage described below.

The magnetic tape wound around the reel is extracted from the magnetic tape cartridge 100 days from the date of magnetic tape cartridge manufacture, a tape sample having a length of 20 cm and including the position of 10 m±1 m from the tape outer end is cut out, and a tape width is obtained by the method described above. This tape width is set as a tape width before storage. The tape width before storage is a value of a tape sample used for obtaining the tape width difference (B−A) (that is, tape width A obtained as described above), or a value obtained regarding the tape sample cut out to include the position of 10 m±1 m from the tape outer end, from the magnetic tape which is the same magnetic tape of the tape sample used for obtaining the tape width difference (B−A).

The tape sample having a length of 20 cm, of which the tape width before storage is obtained, is stored in a dry environment at a temperature of 52° C. for 24 hours, in a state where a load of 100 g is applied in a tape longitudinal direction, by holding one end portion of this tape sample and hanging a weight of 100 g on the other end portion. The dry environment is an environment of relative humidity equal to or smaller than 10%. The storage is started 100 days from the date of magnetic tape cartridge manufacture. After the storage, a tape width (arithmetical mean of five measured values excluding the maximum value and the minimum value from the measured values obtained in the seven times of measurements) is obtained within 20 minutes after removing the load, in the same manner as in the method described above. This tape width is set as a tape width after storage.

A value obtained by dividing a difference of tape widths before and after storage (tape width before storage−tape width after storage) by the tape width before storage×$10^6$ (unit: ppm) is set as the tape width deformation rate.

Hereinafter, the magnetic tape included in the magnetic tape cartridge will be described more specifically.

Tape Thickness

A thickness (total thickness) of the magnetic tape is equal to or smaller than 5.2 μm. The thinning of the magnetic tape is preferable because it causes high capacity. However, in the magnetic tape thinned to have a thickness equal to or smaller than 5.2 μm, deformations different depending on positions tend to occur in the magnetic tape cartridge over time as described above, in a case where there is no countermeasure, and the inventors have thought that this causes the occurrence of the reproducing error. With respect to this, the magnetic tape in which the tape width difference (B−A) 100 days from the date of magnetic tape cartridge manufacture is 2.4 μm to 12.0 μm, can be referred to as a magnetic tape in which the deformation occurring over time in the magnetic tape cartridge from the recording to the reproducing is caused to occur in advance. Accordingly, it is possible to prevent the occurrence of the reproducing error, in a case of reproducing information recorded on the magnetic tape thinned to have the tape thickness equal to or smaller than 5.2 μm. From a viewpoint of realizing higher capacity, the thickness of the magnetic tape is preferably equal to or smaller than 5.0 μm and more preferably equal to or smaller than 4.8 μm. In addition, from a viewpoint of ease of handling, the thickness of the magnetic tape is preferably equal to or greater than 3.0 μm and more preferably equal to or greater than 3.5 μm.

The tape thickness is a value obtained by the following method.

The magnetic tape wound around the reel is extracted from the magnetic tape cartridge 100 days from the date of magnetic tape cartridge manufacture, 10 tape samples (for example, length of 5 to 10 cm) are cut out from a random portion of the magnetic tape, these tape samples are overlapped, and the thickness is measured. A value which is one tenth of the measured thickness (thickness per one tape sample) is set as the tape thickness. The thickness measurement can be performed using a well-known measurement device capable of performing the thickness measurement at 0.1 μm order. This tape thickness may be obtained by using the magnetic tape used for obtaining the tape width difference (B−A) and/or the tape width deformation rate, and may be obtained by using a magnetic tape cut out from the magnetic tape cartridge having the product lot number same as the magnetic tape cartridge, in which the magnetic tape used for obtaining the tape width difference (B−A) and/or the tape width deformation rate is accommodated.

In addition, various thicknesses such as the thickness of the magnetic layer can be obtained by the following method.

A cross section of the magnetic tape in the thickness direction is exposed with an ion beam and the observation of the exposed cross section is performed using a scanning electron microscope. Various thicknesses can be obtained as the arithmetical mean of the thicknesses obtained at two random portions in the cross section observation. Alternatively, various thicknesses can be obtained as a designed thickness calculated under the manufacturing conditions.

Non-Magnetic Support

The magnetic tape includes at least a non-magnetic support or a magnetic layer. Examples of the non-magnetic support (hereinafter, also simply referred to as a "support") include a polyethylene naphthalate support, a polyamide support, a polyethylene terephthalate support, and a polyamide imide support. These supports can be purchased as a commercially available product or can be manufactured by a well-known method. From hardness, flexibility, and the like, a polyethylene naphthalate support, a polyamide support, and a polyethylene terephthalate support are preferable as the support. The polyethylene naphthalate support means a support including at least a polyethylene naphthalate layer, and includes a support formed of a single or two or more layers of polyethylene naphthalate layers, and a support including one or more other layers in addition to the polyethylene naphthalate layer. This point is also the same for the other support. In addition, polyamide can have an aromatic skeleton and/or an aliphatic skeleton, and polyamide having an aromatic skeleton (aromatic polyamide) is preferable, and aramid is more preferable. Corona discharge, plasma treatment, easy-bonding treatment, or heat treatment may be performed with respect to these supports in advance.

Magnetic Layer

Ferromagnetic Powder

The magnetic layer includes a ferromagnetic powder and a binding agent. As the ferromagnetic powder included in the magnetic layer, ferromagnetic powder known as ferromagnetic powder used in the magnetic layer of various magnetic recording media can be used. It is preferable to use ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still preferably equal to or smaller than 30 nm, still more preferably equal to or smaller than 25 nm, and still even more preferably equal to or smaller than 20 nm. Meanwhile, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm, from a viewpoint of stability of magnetization.

—Hexagonal Ferrite Powder—

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean ferromagnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The activation volume of the hexagonal strontium ferrite powder is preferably 800 to 1,500 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$ and can also be, for example equal to or greater than 850 nm$^3$. In addition, from a viewpoint of further improving electromagnetic conversion characteristics, the activation volume of the hexagonal strontium ferrite powder is more preferably equal to or smaller than 1,400 nm$^3$, even more preferably equal to or smaller than 1,300 nm$^3$, still preferably equal to or smaller than 1,200 nm$^3$, and still more preferably equal to or smaller than 1,100 nm$^3$.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as a "rare earth atom bulk content" or simply as a "bulk content" for rare earth atom) satisfy a ratio of "rare earth atom surface portion content/rare earth atom bulk content>1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content>1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised that it is because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as ferromagnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic tape. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content>1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface portion uneven distribution, σs tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in σs. In one aspect, σs of the hexagonal strontium ferrite powder can be equal to or greater than 45 A·m²/kg and can also be equal to or greater than 47 A·m²/kg. On the other hand, from a viewpoint of noise reduction, σs is preferably equal to or smaller than 80 A·m²/kg and more preferably equal to or smaller than 60 A·m²/kg. σs can be measured by using a known measurement device capable of measuring magnetic properties such as a vibrating sample magnetometer. Unless stated otherwise, the mass magnetization σs is a value measured at a magnetic field strength of 1,194 kA/m (15 kOe).

With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

—Metal Powder—

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

—ε-Iron Oxide Powder—

As a preferred specific example of the ferromagnetic powder, ε-iron oxide powder can also be used. In the invention and the specification, the "ε-iron oxide powder" is to be understood to mean ferromagnetic powder from which an ε-iron oxide type crystal structure can be detected as a main phase by X-ray diffraction analysis. For example, when the diffraction peak with the highest intensity in an X-ray diffraction spectrum obtained by X-ray diffraction analysis is assigned to the ε-iron oxide type crystal structure, it shall be determined that the ε-iron oxide type crystal structure is detected as a main phase. As a method for producing ε-iron oxide powder, a method for producing ε-iron oxide powder from goethite and a reverse micelle method has been known. Both of the above-described production methods has been publicly known. Moreover, J. Jpn. Soc. Powder Metallurgy Vol. 61 Supplement, No. 51, pp. S280-S284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in a magnetic layer of the magnetic tape, however, is not limited to these methods.

The activation volume of the ε-iron oxide powder is preferably 300 to 1,500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$ and can also be, for example equal to or greater than 500 $nm^3$. In addition, from a viewpoint of further improving electromagnetic conversion characteristics, the activation volume of the ε-iron oxide powder is more preferably equal to or smaller than 1,400 $nm^3$, even more preferably equal to or smaller than 1,300 $nm^3$, still preferably equal to or smaller than 1,200 $nm^3$, and still more preferably equal to or smaller than 1,100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing information recorded on a magnetic tape, it is desirable that the mass magnetization σs of ferromagnetic powder included in the magnetic tape is high. In regards to this point, in one aspect, σs of the ε-iron oxide powder can be equal to or greater than 8 $A \cdot m^2/kg$ and can also be equal to or greater than 12 $A \cdot m^2/kg$. On the other hand, from a viewpoint of noise reduction, σs of the ε-iron oxide powder is preferably equal to or smaller than 40 $A \cdot m^2/kg$ and more preferably equal to or smaller than 35 $A \cdot m^2/kg$.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent and one or more kinds of additives may be further randomly included. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resin. As the binding agent, various resins normally used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The content of the curing agent of the magnetic layer forming composition can be, for example, 0 to 80.0 parts by mass with respect to 100.0 parts by mass of the binding agent, and can be 50.0 to 80.0 parts by mass, from a viewpoint of improvement of hardness of the magnetic layer.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, descriptions disclosed in paragraphs 0030 to 0033, 0035, and 0036 of JP2016-126817A can be referred to. The lubricant may be included in the non-magnetic layer which will be described later. For the lubricant which may be included in the non-magnetic layer, descriptions disclosed in paragraphs 0030, 0031, 0034, 0035, and 0036 of JP2016-126817A can be referred to. For the dispersing agent, descriptions disclosed in paragraphs 0061 and 0071 of JP2012-133837A can be referred to. The dispersing agent may be added to a non-magnetic layer forming composition. For the dispersing agent which may be added to the non-magnetic layer forming composition, a description disclosed in a paragraph 0061 of JP2012-133837A can be referred to. As the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used for improving dispersibility of the abrasive in the magnetic layer including the abrasive, a dispersing agent disclosed in paragraphs 0012 to 0022 of JP2013-131285A can be used.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including a non-magnetic powder and a binding agent on a surface side of the non-magnetic support opposite to the surface side provided with the magnetic layer. The back coating layer preferably includes any one or both of carbon black and inorganic powder. For the binding agent included in the back coating layer and various additives which can be randomly included therein, a well-known technology regarding the back coating layer can be applied, and a well-known technology regarding the process of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Various Thicknesses

The thickness (total thickness) of the magnetic tape is as described above.

A thickness of the non-magnetic support is preferably 3.0 to 5.0 μm.

A thickness of the magnetic layer can be optimized according to a saturation magnetization amount of a magnetic head used, a head gap length, a recording signal band, and the like, is normally 0.01 μm to 0.15 μm, and is preferably 0.02 μm to 0.12 μm and more preferably 0.03 μm to 0.1 μm, from a viewpoint of realization of high-density recording. The magnetic layer may be at least one layer, or the magnetic layer can be separated to two or more layers having different magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.1 to 1.5 μm and is preferably 0.1 to 1.0 μm.

A thickness of the back coating layer is preferably equal to or smaller than 0.9 μm and more preferably 0.1 to 0.7 μm.

Manufacturing Step

Preparation of Each Layer Forming Composition

Steps of preparing the composition for forming the magnetic layer, the non-magnetic layer, or the back coating layer generally include at least a kneading step, a dispersing step, or a mixing step provided before and after these steps, if necessary. Each step may be divided into two or more stages. The components used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, the binding agent may be separately added in the kneading step, the dispersing step, and a mixing step for adjusting a viscosity after the dispersion. In order to manufacture the magnetic tape, a well-known manufacturing technology can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. As a disperser, a well-known disperser can be used. The filtering may be performed by a well-known method in any stage for preparing each layer forming composition. The filtering can be performed by using a filter, for example. As the filter used in the filtering, a filter having a hole diameter of 0.01 to 3 μm (for example, filter made of glass fiber or filter made of polypropylene) can be used, for example.

Coating Step

The magnetic layer can be formed by directly applying the magnetic layer forming composition onto the surface of the non-magnetic support or performing multilayer coating with the non-magnetic layer forming composition in order or at the same time. The back coating layer can be formed by directly applying the back coating layer forming composition onto the surface of the non-magnetic support opposite to the surface provided with the non-magnetic layer and/or the magnetic layer (or non-magnetic layer and/or the magnetic layer is to be provided). For the details of the coating for forming each layer, a description disclosed in a paragraph 0066 of JP2010-231843A can be referred to.

Other Steps

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process, while the coating layer is wet (not dried). For the alignment process, various well-known technologies such as a description disclosed in a paragraph 0067 of JP2010-231843A can be used.

Through various steps, a long magnetic tape raw material can be obtained. The obtained magnetic tape raw material is cut (slit) by a well-known cutter to have a magnetic tape to be wound and mounted on the magnetic tape cartridge. The width is determined according to the regulation and is normally ½ inches (0.0127 meters).

In the magnetic tape obtained by slitting, a servo pattern can also be formed by a well-known method, in order to allow head tracking servo to be performed in the magnetic tape device (drive). For example, a servo pattern can be formed on the magnetic layer which has been subjected to direct current (DC) demagnetization. The direction of the demagnetization can be a longitudinal direction or a vertical direction of the magnetic tape. Moreover, the direction of magnetization upon forming a servo pattern (i.e., a magnetized region) can be a longitudinal direction or a vertical direction of the magnetic tape.

Heat Treatment

As described above, by causing the deformation which may occur in the magnetic tape cartridge over time from the recording to the reproducing, to occur in advance, it is possible to control the tape width differences (B−A) in the range described above. For this, the magnetic tape cut to have the width described above is preferably wound around a core member and is subjected to the heat treatment in the wound state. By this heat treatment, it is possible to cause the deformation which may occur in the magnetic tape wound around the reel in the magnetic tape cartridge over time from the recording to the reproducing, to occur in advance.

In one aspect, the heat treatment is performed in a state where the magnetic tape is wound around the core member for heat treatment (hereinafter, referred to as a "core for heat treatment"), the magnetic tape after the heat treatment is wound around a reel of the magnetic tape cartridge, and a magnetic tape cartridge in which the magnetic tape is wound around the reel can be manufactured.

The core for heat treatment can be formed of metal, a resin, or paper. The material of the core for heat treatment is preferably a material having high rigidity, from a viewpoint of preventing the occurrence of a winding defect such as spoking or the like. From this viewpoint, the core for heat treatment is preferably formed of metal or a resin. In addition, as an index for rigidity, a modulus of bending elasticity of the material for the core for heat treatment is preferably equal to or greater than 0.2 GPa and more preferably equal to or greater than 0.3 GPa. Meanwhile, since the material having high rigidity is normally expensive, the use of the core for heat treatment of the material having rigidity exceeding the rigidity capable of preventing the occurrence of the winding defect causes the cost increase. By considering the viewpoint described above, the modulus of bending elasticity of the material for the core for heat treatment is preferably equal to or smaller than 250 GPa. The modulus of bending elasticity is a value measured based on international organization for standardization (ISO) 178 and the modulus of bending elasticity of various materials is well known. In addition, the core for heat treatment can be a solid or hollow core member. In a case of a hollow state, a wall thickness is preferably equal to or greater than 2 mm, from a viewpoint of maintaining the rigidity. In addition, the core for heat treatment may include or may not include a flange.

The magnetic tape having a length equal to or greater than a length to be finally accommodated in the magnetic tape cartridge (hereinafter, referred to as a "final product length" is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final product length, and is preferably the "final product length+$\alpha$", from a viewpoint of ease of winding around the core for heat treatment. $\alpha$ is preferably equal to or greater than 5 m, from a viewpoint of ease of the winding. The tension in a case of winding around the core for heat treatment is preferably equal to or greater than 0.1 N (newton), from viewpoints of ease of the winding, ease of adjusting the tape width difference (B−A) by heat treatment, and manufacturing suitability. In addition, from a viewpoint of preventing the occurrence of excessive deformation, the tension in a case of winding around the core for heat treatment is preferably equal to or smaller than 1.5 N and more preferably equal to or smaller than 1.0 N. An outer diameter of the core for heat treatment is preferably equal to or greater than 20 mm and more preferably equal to or greater than 40 mm, from viewpoints of ease of the winding and preventing coiling (curl in longitudinal direction). Meanwhile, from a viewpoint of ease of adjusting the tape width difference (B−A) to be in the range described above, the outer diameter of the core for heat treatment is preferably equal to or smaller than 100 mm and more preferably equal to or smaller than 90 mm. A width of the core for heat treatment may be equal to or greater than the width of the magnetic tape wound around this core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to prevent the occurrence of the tape deformation which is not intended during the detaching operation. It is preferable the detached magnetic tape is wound around another core temporarily (referred to as a "core for temporary winding"), and the magnetic tape is wound around a reel (generally, outer diameter is appropriately 40 to 50 mm) of the magnetic tape cartridge from the core for temporary winding. Accordingly, a relationship between the inside and the outside with respect to the core for heat treatment of the magnetic tape in a case of the heat treatment can be maintained and the magnetic tape can be wound around the reel of the magnetic tape cartridge. Regarding the details of the core for temporary winding and the tension in a case of winding the magnetic tape around the core, the description described above regarding the core for heat treatment can be referred to. In an aspect in which the heat treatment is subjected to the magnetic tape having a length of the "final product length+$\alpha$", the length corresponding to "+$\alpha$" may be extracted in any stage. For example, in one aspect, the magnetic tape having the final product length may be wound around the reel of the magnetic tape cartridge from the core for temporary winding and the remaining length corresponding the "+$\alpha$" may be extracted. From a viewpoint of decreasing the amount of the portion to be cut out and removed, the a is preferably equal to or smaller than 20 m.

The specific aspect of the heat treatment performed in a state of being wound around the core member as described above is described below.

An atmosphere temperature for performing the heat treatment (hereinafter, referred to as "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability. The heat treatment time is preferably equal to or longer than 0.3 hours and more preferably equal to or longer than 0.5 hours. In addition, the heat treatment time s preferably equal to or shorter than 48 hours, from a viewpoint of production efficiency.

By performing the heat treatment as described above, it is possible to manufacture the magnetic tape cartridge including the magnetic tape having the tape width difference (B−A) of 2.4 μm to 12.0 μm, as a value 100 days from the date of magnetic tape cartridge manufacture. The tape width of the magnetic tape subjected to the heat treatment generally becomes wider from the tape outer end towards the inner end. Accordingly, in a case of measuring the tape width of the tape sample collected from a random position between the measurement position of the tape width A and the measurement position of the tape width B, the value is normally a value greater than the tape width A and smaller than the tape width B, as the value 100 days from the date of magnetic tape cartridge manufacture.

That is, according to one aspect, it is possible to provide a manufacturing method of the magnetic tape cartridge according to one aspect of the invention. In such a manufacturing method, by cutting out the magnetic tape having an equivalent width from the magnetic tape raw material and performing the heat treatment of the cut-out magnetic tape in a state of being wound around the core member, it is possible to cause the magnetic tape to be deformed so that the tape width difference (B−A) is 2.4 μm to 12.0 μm as a value 100 days from the date of magnetic tape cartridge manufacture. The details of the manufacturing method are as described above.

In one aspect, the shipping date of the magnetic tape cartridge (date when the magnetic tape cartridge is shipped as a product from the factory) can be any day in the period from the date of magnetic tape cartridge manufacture to the 100th day. Even in a case where the magnetic tape cartridge shipped in the period described above is used in an initial stage after the shipping, it is possible to prevent the occurrence of the reproducing error. It is preferable to ship the magnetic tape cartridge in the period from the date of magnetic tape cartridge manufacture to the 100th day, from a viewpoint that the inventory storage for a long period of time is not necessary.

The magnetic tape cartridge can be mounted on the magnetic tape device including a magnetic head and can be used for performing the recording and/or reproducing of the information. In the invention and the specification, the "magnetic tape device" means a device capable of performing at least one of the recording of information on the magnetic tape or the reproducing of information recorded on the magnetic tape. Such a device is generally called a drive. The magnetic head included in the magnetic tape device can be a recording head capable of performing the recording of information on the magnetic tape, and can also be a reproducing head capable of performing the reproducing of information recorded on the magnetic tape. In addition, in one aspect, the magnetic tape device can include both of a recording head and a reproducing head as separate magnetic heads. In another aspect, the magnetic head included in the magnetic tape device can also have a configuration of including both of a recording element and a reproducing element in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads (for example, a giant magnetoresistive (GMR) head or a tunnel magnetoresistive (TMR) head) can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) including a servo pattern reading element may be included in the magnetic tape device.

In the magnetic tape device, the recording of information on the magnetic tape and/or the reproducing of information recorded on the magnetic tape can be performed by bringing the surface of the magnetic layer of the magnetic tape into contact with the magnetic head and sliding. The magnetic tape device can include the magnetic tape cartridge according to one aspect of the invention to be attachable and detachable, and well-known technologies can be applied for the other configurations.

The magnetic tape device includes the magnetic tape cartridge according to one aspect of the invention. Therefore, it is possible to prevent the occurrence of the reproducing error in a case of reproducing the information recorded on the magnetic tape.

EXAMPLES

Hereinafter, one aspect of the invention will be described with reference to examples. However, the invention is not limited to aspects shown in the examples. "Parts" and "%" in the following description mean "parts by mass" and "% by mass", unless otherwise noted. "eq" is an equivalent which is a unit which cannot be converted into the SI unit.

In addition, the various steps and operations described below were performed in an environment of a temperature of 20° C. to 25° C. and relative humidity of 40% to 60%, unless otherwise noted.

In Table 1, BaFe indicates hexagonal ferrite barium powder, SrFe indicates hexagonal ferrite strontium powder, ε-iron oxide indicates ε-iron oxide powder, PEN indicates a polyethylene naphthalate support, PA indicates an aromatic polyamide support, and PET indicates a polyethylene terephthalate support.

Example 1

(1) Preparation of Alumina Dispersion 3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin including a $SO_3Na$ group as a polar group (UR-4800 manufactured by Toyobo Co., Ltd. (polar group amount: 80 meq/kg)), and 570.0 parts of a mixed solution of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a Brunauer-Emmett-Teller (BET) specific surface area of 20 m$^2$/g, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Liquid
Ferromagnetic powder: 100.0 parts
Ferromagnetic hexagonal barium ferrite powder having average particle size (average plate diameter) of 21 nm
  SO3Na group-containing polyurethane resin: 14.0 parts
  Weight-average molecular weight: 70,000, SO3Na group: 0.2 meq/g
  Cyclohexanone: 150.0 parts
  Methyl ethyl ketone: 150.0 parts
  Abrasive Solution
  Alumina dispersion prepared in the section (1): 6.0 parts
  Silica Sol (projection forming agent liquid)
  Colloidal silica (Average particle size: 120 nm) 2.0 parts
  Methyl ethyl ketone: 1.4 parts
  Other Components
  Stearic acid: 2.0 parts
  Stearic acid amide: 0.2 parts
  Butyl stearate: 2.0 parts
  Polyisocyanate (CORONATE (registered trademark) L manufactured by Tosoh Corporation): 2.5 parts
  Finishing Additive Solvent
  Cyclohexanone: 200.0 parts
  Methyl ethyl ketone: 200.0 parts
(3) Non-Magnetic Layer Forming Composition List
Non-magnetic inorganic powder: α-iron oxide: 100.0 parts
Average particle size (average long axis length): 0.15 μm
Average acicular ratio: 7
BET specific surface area: 52 m$^2$/g
Carbon black: 20.0 parts
Average particle size: 20 nm
SO3Na group-containing polyurethane resin: 18.0 parts
Weight-average molecular weight: 70,000, SO3Na group: 0.2 meq/g
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Carbon black: 100.0 parts
Dibutyl phthalate (DBP) oil absorption: 74 cm$^3$/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 m$^2$/g): 0.6 parts
Methyl ethyl ketone: 600.0 parts
Toluene: 600.0 parts
Polyisocyanate (CORONATE L manufactured by Tosoh Corporation): 15.0 parts
(5) Preparation of Each Layer Forming Composition The magnetic layer forming composition was prepared by the following method. The magnetic liquid was prepared by dispersing (beads-dispersing) each component by using a batch type vertical sand mill for 24 hours. Zirconia beads having a bead diameter of 0.5 mm were used as the dispersion beads. The prepared magnetic liquid, the abrasive solution, and other components (silica sol, other components, and finishing additive solvent) were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method. The components described above excluding the lubricant (stearic acid, stearic acid amide, and butyl stearate) were kneaded and diluted by an open kneader, and subjected to a dispersion process with a transverse beads mill disperser. After that, the lubricant (stearic acid, stearic acid amide, and butyl stearate) was added, and stirred and mixed with a dissolver stirrer, and a non-magnetic layer forming composition was prepared.

The back coating layer forming composition was prepared by the following method. The components excluding polyisocyanate were introduced in a dissolver stirrer and stirred at a circumferential speed of 10 msec for 30 minutes, and the dispersion process was performed with a transverse beads mill disperser. After that, polyisocyanate was added, and stirred and mixed with a dissolver stirrer, and a back coating layer forming composition was prepared.

(6) Manufacturing Method of Magnetic Tape and Magnetic Tape Cartridge

The non-magnetic layer forming composition prepared in the section (5) was applied to a surface of a support having the kind and thickness shown in Table 1 so that the thickness after the drying becomes a thickness shown in Table 1 and was dried to form a non-magnetic layer. Then, the magnetic layer forming composition prepared in the section (5) was applied onto the non-magnetic layer so that the thickness after the drying becomes a thickness shown in Table 1, and a coating layer was formed. After that, a homeotropic alignment process was performed by applying a magnetic field having a magnetic field strength of 0.3 T in a vertical direction with respect to a surface of a coating layer, while the coating layer of the magnetic layer forming composition is wet (not dried), and was dried to form a magnetic layer. After that, the back coating layer forming composition prepared in the section (5) was applied to the surface of the support shown in Table 1 on a side opposite to the surface where the non-magnetic layer and the magnetic layer were formed, so that the thickness after the drying becomes a thickness shown in Table 1, and was dried to form a back coating layer.

After that, a surface smoothing treatment (calender process) was performed by using a calender roll configured of only a metal roll, at a speed of 100 m/min, linear pressure of 294 kN/m (300 kg/cm), and a calender temperature (surface temperature of a calender roll) of 90° C.

Then, the heat treatment was performed by storing the long magnetic tape raw material in a heat treatment furnace at the atmosphere temperature of 70° C. (heat treatment time: 36 hours). After the heat treatment, the magnetic tape was obtained by slitting the long magnetic tape raw material to have a width of ½ inches (0.0127 meters). By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained.

The magnetic tape (length of 960 m) after recording the servo signal was wound around the core for heat treatment, and the heat treatment was performed in a state of being wound around this core. As the core for heat treatment, a solid core member (outer diameter: 50 mm) formed of a resin and having 0.8 GPa of a modulus of bending elasticity was used, and the tension at the time of the winding was set as 0.6 N. The heat treatment was performed at the heat treatment temperature shown in Table 1 for 5 hours. The weight absolute humidity in the atmosphere in which the heat treatment was performed was 10 g/kg Dry air.

After the heat treatment, the magnetic tape and the core for heat treatment were sufficiently cooled, the magnetic tape was extracted from the core for heat treatment and wound around the core for temporary winding, and then, the magnetic tape having the final product length (950 m) was wound around a reel (reel outer diameter: 44 mm) of the magnetic tape cartridge (LTO Ultrium 7 data cartridge) from the core for temporary winding. The remaining length of 10 m was cut out and the leader tape based on section 9 of Standard ECMA (European Computer Manufacturers Association)-319 (June 2001) Section 3 was bonded to the end of the cut-out side by using a commercially available splicing tape. As the core for temporary winding, a solid core member having the same outer diameter and formed of the same material as the core for heat treatment was used, and the tension at the time of winding was set as 0.6 N.

As described above, a single reel type magnetic tape cartridge of Example 1 in which the magnetic tape having a length of 950 m was wound around a reel was manufactured.

In the examples, the comparative examples, and reference examples, two magnetic tape cartridges were manufactured, one of them was used in the evaluation which will be described later, and the other one was used in a recording and reproducing test which will be described later. The date when the magnetic tape was accommodated in the magnetic tape cartridge was recorded on a RFID tag in each magnetic tape cartridge as the date of magnetic tape cartridge manufacture (date of manufacturer).

Examples 2 to 6

A magnetic tape cartridge was manufactured in the same manner as in Example 1, except that the heat treatment performed in a state where the magnetic tape was wound around the core for heat treatment, was performed at a heat treatment temperature shown in Table 1.

Example 7

A magnetic tape cartridge was manufactured in the same manner as in Example 1, except that a support shown in Table 1 was used as the support, and the heat treatment performed in a state where the magnetic tape was wound around the core for heat treatment, was performed at a heat treatment temperature shown in Table 1.

Example 8

A magnetic tape cartridge was manufactured in the same manner as in Example 7, except that heat treatment performed in a state where the magnetic tape was wound around the core for heat treatment, was performed at a heat treatment temperature shown in Table 1.

Example 9

A magnetic tape cartridge was manufactured in the same manner as in Example 1, except that a support shown in Table 1 was used as the support, and the heat treatment performed in a state where the magnetic tape was wound around the core for heat treatment, was performed at a heat treatment temperature shown in Table 1.

Example 10

A magnetic tape cartridge was manufactured in the same manner as in Example 9, except that heat treatment performed in a state where the magnetic tape was wound around the core for heat treatment, was performed at a heat treatment temperature shown in Table 1.

Example 11

A magnetic tape cartridge was manufactured in the same manner as in Example 1, except that the ferromagnetic powder was changed to the hexagonal strontium ferrite powder prepared by the following method.

(Preparation Method of Hexagonal Strontium Ferrite Powder)

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetic acid having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

The hexagonal strontium ferrite powder obtained above had an average particle size of 18 nm, an activation volume of 902 $nm^3$, an anisotropy constant of $2.2 \times 10^5$ $J/m^3$, and a mass magnetization σs of 49 $A·m^2/kg$.

12 mg of sample powder was collected from the hexagonal strontium ferrite powder obtained above, element analysis of filtrate obtained by partially dissolving the sample powder under the dissolving conditions exemplified above was performed by the ICP analysis device, and the surface portion content of neodymium atom was obtained.

Separately, 12 mg of sample powder was collected from the hexagonal strontium ferrite powder obtained above, element analysis of filtrate obtained by totally dissolving the sample powder under the dissolving conditions exemplified above was performed by the ICP analysis device, and the surface portion content of neodymium atom was obtained.

In the hexagonal strontium ferrite powder, the content (bulk content) of neodymium atom with respect to 100 atom % of iron atom was 2.9 atom %, and the surface portion content of neodymium atom was 8.0 atom %. The "surface portion content/bulk content", that is a ratio of the surface portion content to the bulk content, was 2.8. It was confirmed that the neodymium atom was unevenly distributed in the surface portion of the particles.

The X-ray diffraction analysis of the powder obtained above was performed by scanning with a CuKα ray at a voltage of 45 kV and intensity of 40 mA and by measuring X-ray diffraction pattern under the conditions. By the X-ray diffraction analysis it was confirmed that the powder obtained above showed the crystal structure of hexagonal ferrite. The powder obtained above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees Example 12

A magnetic tape cartridge was manufactured in the same manner as in Example 1, except that the ferromagnetic powder was changed to the hexagonal strontium ferrite powder prepared by the following method.
(Preparation Method of Hexagonal Strontium Ferrite Powder)

At first, 1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed, and were then mixed with a mixer to obtain a raw material mixture.

The obtained raw material mixture was dissolved in a platinum crucible at a melting temperature of 1380° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

Then, 280 g of the obtained amorphous material was placed in an electric furnace, the temperature in the electric furnace was raised to 645° C. (crystallization temperature), and the amorphous material was still stood in the electric furnace for 5 hours at the same temperature, to precipitate (crystalize) hexagonal strontium ferrite particles.

Subsequently, the above-obtained crystal containing hexagonal strontium ferrite particles was roughly ground in a mortar, and the ground crystals was put in a glass bottle, together with 1000 g of zirconia beads having a particle diameter of 1 mm and 800 ml of acetic acid having a concentration of 1% and were subjected to a dispersion treatment for 3 hours with a paint shaker. Thereafter, the obtained dispersion was separated from the beads and put in a stainless beaker. The dispersion was stood still at a liquid temperature of 100° C. for 3 hours to dissolve a glass component, and thereafter centrifuged in a centrifugal separator to precipitation and were repeatedly decanted to wash the precipitated matter and the precipitated matter is dried in a furnace at an in-furnace temperature of 110° C. for 6 hours, to obtain hexagonal strontium ferrite powder.

The obtained hexagonal strontium ferrite powder had an average particle size of 19 nm, an activation volume of 1102 $nm^3$, an anisotropy constant Ku of $2.0 \times 10^5$ $J/m^3$, and a mass magnetization σs of 50 $A \cdot m^2/kg$.

Example 13

A magnetic tape cartridge was manufactured in the same manner as in Example 1, except that the ferromagnetic powder was changed to the ε-iron oxide powder prepared by the following method.
(Preparation Method of ε-Iron Oxide Powder)

A solution was prepared by dissolving 8.3 g of iron(III) nitrate nonahydrate, 1.3 g of gallium(III) nitrate octahydrate, 190 mg of cobalt(II) nitrate hexahydrate, 150 mg of titanium (IV) sulfate, and 1.5 g of polyvinylpyrrolidone (PVP) in 90 g of pure water. While stirring the solution using a magnetic stirrer, 4.0 g of aqueous ammonia solution having a concentration of 25% was then added to the solution in the atmosphere under a condition of an ambient temperature of 25° C. and stirred for subsequent 2 hours under the same ambient temperature of 25° C. A citric acid solution, which was obtained by dissolving 1 g of citric acid in 9 g of pure water, was added to the obtained solution, and the obtained mixture was then stirred for 1 hour. Powder precipitated after the stirring was collected by centrifugal separation, washed with pure water, and dried in a furnace at an in-furnace temperature of 80° C.

To the dried powder, 800 g of pure water was added to disperse the powder in water again for preparing a dispersion. The obtained dispersion was heated at a liquid temperature of 50° C., and 40 g of aqueous ammonia solution having a concentration of 25% was added dropwise thereto while stirring the dispersion. The dispersion was stirred for 1 hour while maintaining the liquid temperature at 50° C., and 14 mL of tetraethoxysilane (TEOS) was then added dropwise to the dispersion, and the obtained mixture was then stirred for 24 hours. To the obtained reaction solution, 50 g of ammonium sulfate was added, and precipitated powder was then collected by centrifugal separation, washed with pure water, and dried in a furnace at an in-furnace temperature of 80° C., to obtain a ferromagnetic powder precursor.

The obtained ferromagnetic powder precursor was put in a furnace at an in-furnace temperature of 1000° C. in the atmosphere and heat-treated for 4 hours.

The heat-treated ferromagnetic powder precursor was introduced into a 4 mol/L aqueous sodium hydroxide (NaOH) solution, and then stirred for 24 hours while maintaining a liquid temperature at 70° C. to remove impurity silicate compound from the ferromagnetic powder precursor subjected to the heat treatment.

Thereafter, the ferromagnetic powder from which a silicate compound has been removed was collected by a centrifugal separation and washed with pure water, to obtain ferromagnetic powder.

The composition of the obtained ferromagnetic powder was analyzed by inductively coupled plasma-optical emission spectrometry (ICP-OES) and was found to be Ga, Co, and Ti substitution-type ε-iron oxide (ε-$Ga_{0.58}Fe_{1.42}O_3$). Moreover, the obtained ferromagnetic powder was analyzed by X-ray diffraction analysis under the same conditions as described in Example 11 described above, and it was confirmed from peaks in the X-ray diffraction pattern that the obtained ferromagnetic powder did not have crystal structures of α phase and γ phase and had a single crystal structure of ε phase (ε-iron oxide type crystal structure).

The obtained ε-iron oxide powder had an average particle size of 12 nm, an activation volume of 746 nm$^3$, an anisotropy constant Ku of $1.2 \times 10^5$ J/m$^3$, and a mass magnetization σs of 16 A·m$^2$/kg.

The activation volume and anisotropy constant Ku of each of the hexagonal strontium ferrite powder and the ε-iron oxide powder were values determined by the above-described method using a vibrating sample magnetometer (manufactured by Toei Industry Co., Ltd.).

Moreover, the mass magnetization σs is a value measured using a vibrating sample magnetometer (manufactured by Toei Industry Co., Ltd.) at a magnetic field strength of 1194 kA/m (15 kOe).

Reference Example 1

A magnetic tape cartridge was manufactured in the same manner as in Example 1, except that each layer having a thickness shown in Table 1 was formed using a support having a thickness shown in Table 1, and the heat treatment in a state where the magnetic tape was wound around the core for heat treatment, was not performed.

Comparative Example 1

A magnetic tape cartridge was manufactured in the same manner as in Example 1, except that the heat treatment in a state where the magnetic tape was wound around the core for heat treatment, was not performed.

Comparative Examples 2 and 3

A magnetic tape cartridge was manufactured in the same manner as in Example 1, except that the heat treatment performed in a state where the magnetic tape was wound around the core for heat treatment, was performed at a heat treatment temperature shown in Table 1.

Comparative Example 4

A magnetic tape cartridge was manufactured in the same manner as in Example 7, except that the heat treatment in a state where the magnetic tape was wound around the core for heat treatment, was not performed.

Comparative Example 5

A magnetic tape cartridge was manufactured in the same manner as in Example 9, except that the heat treatment in a state where the magnetic tape was wound around the core for heat treatment, was not performed.

Evaluation of Magnetic Tape

The magnetic tape was extracted from each magnetic tape cartridge of the examples and the comparative examples 100 days from the date of magnetic tape cartridge manufacture, and the following evaluations were performed with respect to the extracted magnetic tape.

(1) Tape Width Difference (B−A)

The leader tape bonded to the tape outer end was removed, and a tape sample having a length of 20 cm and including the position of 10 m±1 m from the tape outer end, and a tape sample having a length of 20 cm and including the position of 50 m±1 m from the tape inner end were cut out.

The tape width of each tape sample was measured at the center in a longitudinal direction of the tape sample in a state of being sandwiched between two sheets of slide glass, in order to remove the effect of curl. The measurement of the tape width was performed within 20 minutes after extracting the magnetic tape from the magnetic tape cartridge, using a laser high accuracy dimension measurement device LS-7030 manufactured by Keyence Corporation. In each tape sample, the tape width was respectively measured seven times (N=7), and an arithmetical mean of five measured values excluding the maximum value and the minimum value from the measured values obtained in the seven times of measurements was obtained. The arithmetical mean obtained as described above was set as a tape width (tape width A or tape width B) at each position and the tape width difference (B−A) was calculated.

(2) Tape Width Deformation Rate

The tape width A obtained by the section (1) was set as a tape width before storage.

The tape sample having a length of 20 cm and including the position of 10 m±1 m from a tape outer end was stored in a dry environment at a temperature of 52° C. for 24 hours, in a state where the measurement in the section (1) was performed, and a load of 100 g was applied in a tape longitudinal direction, by holding one end portion of this tape sample and hanging a weight of 100 g on the other end portion. After the storage, a tape width was obtained within 20 minutes after removing the load, in the same manner as in the method in the section (1), and this tape width was set as the tape width after storage.

A value obtained by dividing a difference of tape widths before and after storage (tape width before storage−tape width after storage) by the tape width before storage×10$^6$ (unit: ppm) was calculated and set as the tape width deformation rate.

(3) Tape Thickness 10 tape samples (for example, length of 5 cm) were cut out from a random portion of the magnetic tape extracted from the magnetic tape cartridge, these tape samples were overlapped, and the thickness was measured. The measurement of the thickness was performed using a compact amplifier Millimar 1240 and a digital thickness meter of induction probe Millimar 1301 manufactured by MARH. A value which is one tenth of the measured thickness (thickness per one tape sample) was set as the tape thickness.

The thickness of each layer shown in Table 1 is a designed thickness calculated under the manufacturing conditions and the thickness of the support is a manufacturer's value.

Recording and Reproducing Test

The magnetic tape cartridge in which the data of regulated capacity was recorded on the magnetic tape was stored in the environment of a temperature of 40° C. and relative humidity of 80% for 3 months, and it was evaluated whether or not the reproducing can be performed in a case where the reproducing (reading) of the entire recording data was performed. The recording and the reproducing were performed using a LTO Ultrium 7 (LTO 7) drive. The regulated capacity is 6.0 TB (terabytes).

The recording of data was performed after placing the magnetic tape cartridge in the evaluation environment 100 days from the date of magnetic tape cartridge manufacture, leaving for longer than a day, and exposing to the same environment. In a case where the error occurs during the recording and the recording of the regulated capacity cannot be performed, the cartridge cannot be used in the subsequent evaluation and shown as "cannot be evaluated" in Table 1. The case of the "cannot be evaluated" described above is specifically a case where the magnetic head cannot be positioned at a position to be recorded and the drive sends an error signal and stopped, even in a case where a servo pattern was read by a servo head of the drive and the head tracking was performed.

After the storage, the reproducing was performed in the environment of a temperature and humidity which are the same as the environment in which the recording was performed, and this reproducing was performed using the solid drive which is the same as that used during the recording. The reproducing was also performed after leaving the magnetic tape cartridge in the evaluation environment for longer than a day, and exposing to the same environment. Regarding the entire data recorded on the magnetic tape in the magnetic tape cartridge, in a case where the reproducing was completed without the occurrence of the error, "reproducible" was shown in Table 1. In a case where the data could not be properly read from the reproducing signal due to a poor signal-to-noise-ratio (SNR) of the reproducing signal at the time of the reproducing, and the error occurs during the reproducing, so that the reproducing of the entire data was not completed, "cannot be reproduced" was shown in Table 1.

The results of the above evaluation are shown in Table 1 (Table 1-1 to Table 1-3).

TABLE 1-1

|  | Example1 | Example2 | Example3 | Example4 | Example5 | Example6 |
|---|---|---|---|---|---|---|
| Kind of ferromagnetic powder | BaFe | BaFe | BaFe | BaFe | BaFe | BaFe |
| Kind of non-magnetic support | PEN | PEN | PEN | PEN | PEN | PEN |
| Thickness of non-magnetic layer | 0.2 μm | 0.2 μm | 0.2 μm | 0.2 μm | 0.2 μm | 0.2 μm |
| Thickness of non-magnetic support | 4.6 μm | 4.6 μm | 4.6 μm | 4.6 μm | 4.6 μm | 4.6 μm |
| Thickness of magnetic layer | 0.1 μm | 0.1 μm | 0.1 μm | 0.1 μm | 0.1 μm | 0.1 μm |
| Thickness of back coating layer | 0.3 μm | 0.3 μm | 0.3 μm | 0.3 μm | 0.3 μm | 0.3 μm |
| Tape thickness | 5.2 μm | 5.2 μm | 5.2 μm | 5.2 μm | 5.2 μm | 5.2 μm |
| Heat treatment temperature | 55° C. | 60° C. | 70° C. | 50° C. | 40° C. | 45° C. |
| Tape width difference (B − A) [μm] | 8.0 | 10.0 | 12.0 | 6.0 | 3.0 | 4.0 |
| Storage deformation rate [ppm] | 310 | 280 | 260 | 360 | 390 | 380 |
| Reproducing | Reproducible | Reproducible | Reproducible | Reproducible | Reproducible | Reproducible |

|  | Example7 | Example8 | Example9 | Example10 | Example11 | Example12 | Example13 |
|---|---|---|---|---|---|---|---|
| Kind of ferromagnetic powder | BaFe | BaFe | BaFe | BaFe | SrFe | SrFe | ε-iron oxide |
| Kind of non-magnetic support | PA | PA | PET | PET | PEN | PEN | PEN |
| Thickness of non-magnetic layer | 0.2 μm | 0.2 μm | 0.2 μm | 0.2 μm | 0.2 μm | 0.2 μm | 0.2 μm |
| Thickness of non-magnetic support | 4.6 μm | 4.6 μm | 4.6 μm | 4.6 μm | 4.6 μm | 4.6 μm | 4.6 μm |
| Thickness of magnetic layer | 0.1 μm | 0.1 μm | 0.1 μm | 0.1 μm | 0.1 μm | 0.1 μm | 0.1 μm |
| Thickness of back coating layer | 0.3 μm | 0.3 μm | 0.3 μm | 0.3 μm | 0.3 μm | 0.3 μm | 0.3 μm |
| Tape thickness | 5.2 μm | 5.2 μm | 5.2 μm | 5.2 μm | 5.2 μm | 5.2 μm | 5.2 μm |
| Heat treatment temperature | 50° C. | 60° C. | 50° C. | 60° C. | 55° C. | 55° C. | 55° C. |
| Tape width difference (B − A) [μm] | 6.0 | 10.0 | 6.0 | 10.0 | 8.0 | 8.0 | 8.0 |
| Storage deformation rate [ppm] | 360 | 280 | 350 | 280 | 310 | 310 | 310 |
| Reproducing | Reproducible | Reproducible | Reproducible | Reproducible | Reproducible | Reproducible | Reproducible |

|  | Reference Example 1 | Comparative Example1 | Comparative Example2 | Comparative Example3 | Comparative Example4 | Comparative Example5 |
|---|---|---|---|---|---|---|
| Kind of hexagonal powder | BaFe | BaFe | BaFe | BaFe | BaFe | BaFe |
| Kind of non-magnetic support | PEN | PEN | PEN | PEN | PA | PET |
| Thickness of non-magnetic layer | 0.3 μm | 0.2 μm | 0.2 μm | 0.2 μm | 0.2 μm | 0.2 μm |
| Thickness of non-magnetic support | 5.3 μm | 4.6 μm | 4.6 μm | 4.6 μm | 4.6 μm | 4.6 μm |
| Thickness of magnetic layer | 0.1 μm | 0.1 μm | 0.1 μm | 0.1 μm | 0.1 μm | 0.1 μm |

TABLE 1-1-continued

| | | | | | | |
|---|---|---|---|---|---|---|
| Thickness of back coating layer | 0.3 μm | 0.3 μm | 0.3 μm | 0.3 μm | 0.3 μm | 0.3 μm |
| Tape thickness | 6.0 μm | 5.2 μm | 5.2 μm | 5.2 μm | 5.2 μm | 5.2 μm |
| Heat treatment temperature | None | None | 30° C. | 80° C. | None | None |
| Tape width difference (B − A) [μm] | 2.0 | 2.0 | 2.3 | 13.0 | 2.0 | 2.0 |
| Storage deformation rate [ppm] | 350 | 500 | 480 | 200 | 500 | 500 |
| Reproducing | Reproducible | Cannot be reproduced | Cannot be reproduced | Cannot be reproduced | Cannot be reproduced | Cannot be reproduced |

The tape width difference (B–A) of the magnetic tape cartridge manufactured in the same manner as in Comparative Example 1 was obtained on 360th day from the date of magnetic tape cartridge manufacture was 4.5 μm, and the tape width deformation rate was 400 ppm. From the comparison between this result, and the evaluation results of Comparative Examples 1, 4, and 5 and Examples 1 to 13 in which the heat treatment in a state of being wound around the core for heat treatment is not performed, it is possible to confirm that the deformation occurring in the magnetic tape cartridge over time could be caused in advance, by performing the heat treatment as in Examples 1 to 13.

In each magnetic tape cartridge of Examples 1 to 13, it was possible to prevent the occurrence of the error to perform the recording and reproducing.

With respect to this, from the comparison between Reference Example 1, and Comparative Examples 1, 2, 4, and 5, it is possible to confirm that the reproducing error easily occurs, in a case where the tape thickness was decreased to be equal to or smaller than 5.2 μm. In Comparative Examples 1, 2, 4, and 5, the occurrence of the reproducing error could not be prevented, and the reproducing of the entire data cannot be completed.

It is thought that the reason of the "cannot be evaluated" in Comparative Example 3 is because, as the tape width difference (B–A) exceeds 12.0 μm, the width varies depending on the position of the tape, and accordingly, the recording error occurs.

One aspect of the invention is effective in the technical fields of various data storage.

What is claimed is:

1. A magnetic tape cartridge of a single reel type in which a magnetic tape is wound around a reel,
   wherein the magnetic tape includes a non-magnetic support, and a magnetic layer including a ferromagnetic powder on the non-magnetic support,
   a thickness of the non-magnetic support is 3.0 to 5.0 μm,
   a tape width difference B−A between a tape width A at a position of 10 m±1 m from a tape outer end and a tape width B at a position of 50 m±1 m from a tape inner end is 2.4 μm to 12.0 μm, and
   the tape width A and the tape width B are values measured 100 days from a date of magnetic tape cartridge manufacture.

2. The magnetic tape cartridge according to claim 1,
   wherein a tape width deformation rate of the magnetic tape measured within 20 minutes, after the magnetic tape is stored in a dry environment at a temperature of 52° C. for 24 hours in a state where a load of 100 g is applied to a tape in a longitudinal direction and the load is removed, is equal to or smaller than 400 ppm, and
   the tape width deformation rate is a value obtained by starting the storage 100 days from a date of magnetic tape cartridge manufacture.

3. The magnetic tape cartridge according to claim 1,
   wherein the magnetic tape includes a non-magnetic layer including a non-magnetic powder, between the non-magnetic support and the magnetic layer.

4. The magnetic tape cartridge according to claim 1,
   wherein the magnetic tape includes a back coating layer including a non-magnetic powder on a surface side of the non-magnetic support opposite to a surface side provided with the magnetic layer.

5. The magnetic tape cartridge according to claim 1,
   wherein the non-magnetic support is a polyethylene naphthalate support.

6. The magnetic tape cartridge according to claim 1,
   wherein the non-magnetic support is an aromatic polyamide support.

7. The magnetic tape cartridge according to claim 1,
   wherein the non-magnetic support is a polyethylene terephthalate support.

8. The magnetic tape cartridge according to claim 2,
   wherein the magnetic tape includes a non-magnetic layer including a non-magnetic powder, between the non-magnetic support and the magnetic layer.

9. The magnetic tape cartridge according to claim 2,
   wherein the magnetic tape includes a back coating layer including a non-magnetic powder on a surface side of the non-magnetic support opposite to a surface side provided with the magnetic layer.

10. The magnetic tape cartridge according to claim 2,
    wherein the non-magnetic support is a polyethylene naphthalate support.

11. The magnetic tape cartridge according to claim 2,
    wherein the non-magnetic support is an aromatic polyamide support.

12. The magnetic tape cartridge according to claim 2,
    wherein the non-magnetic support is a polyethylene terephthalate support.

* * * * *